United States Patent [19]

Anderson et al.

[11] Patent Number: 5,199,631
[45] Date of Patent: Apr. 6, 1993

[54] DIFFERENTIAL PRESSURE METHOD AND APPARATUS FOR BONDING HIGH TEMPERATURE STRUCTURES

[75] Inventors: John J. Anderson, San Diego; Ken Schertzer, Imperial Beach, James F. Steckbeck San Diego; Donald O. Nelepovitz, San Diego, all of Caif.

[73] Assignee: Rohr, Inc., Chula Vista, Calif.

[21] Appl. No.: 890,834

[22] Filed: Jun. 1, 1992

[51] Int. Cl.$^5$ .............................................. B23K 20/00
[52] U.S. Cl. .................................. 228/181; 228/195; 228/234; 228/44.3
[58] Field of Search ..................... 228/44.3, 178, 181, 228/190, 195, 234, 240, 242; 29/421.1; 72/54, 60

[56] References Cited

U.S. PATENT DOCUMENTS 3,073,268  1/1963  Cole ..................... 228/181
3,091,846  6/1963  Henry .................. 228/181

FOREIGN PATENT DOCUMENTS 1445877 12/1988 U.S.S.R. ........................... 228/181

Primary Examiner—Samuel M. Heinrich
Attorney, Agent, or Firm—Patrick J. Schlesinger; Frank D. Gilliam

[57] ABSTRACT

A method and apparatus for bonding high temperature structures, such as face sheets to high performance honeycomb cores, using differential gas pressure at high temperatures. A high temperature resistant, foil sheet having a thickness of from about 0.0005 to 0.003 inch is welded to a support to form a vacuum bag to surround the structure to be bonded. A vacuum line is connected to the bag to allow evacuation of the bag. Typically, the structure is bonded in a vacuum furnace. Initially, the furnace is heated to the bonding temperature of the assembly while both the furnace chamber and the vacuum bag are substantially completely evacuated. Then slight pressure is allowed to return to the chamber to force the foil sheet into intimate presure contact with the structural assembly to bring the components tightly together, using the relative pressure different between the vacuum in the chamber and the vacuum within the bag. The bag material may have superplastic deformation characteristics to allow uniform pressure to be applied to complex shaped structures. The bag and structural assembly are then cooled below the bonding temperature of the assembly. This process and apparatus are particularly suitable for bonding face sheets to honeycomb cores where those components are formed from a metal such as titanium or Inconel and the components are bonded together by a thin layer or brazing material on the surfaces of the face sheets such as by liquid interface diffusion bonding.

27 Claims, 2 Drawing Sheets

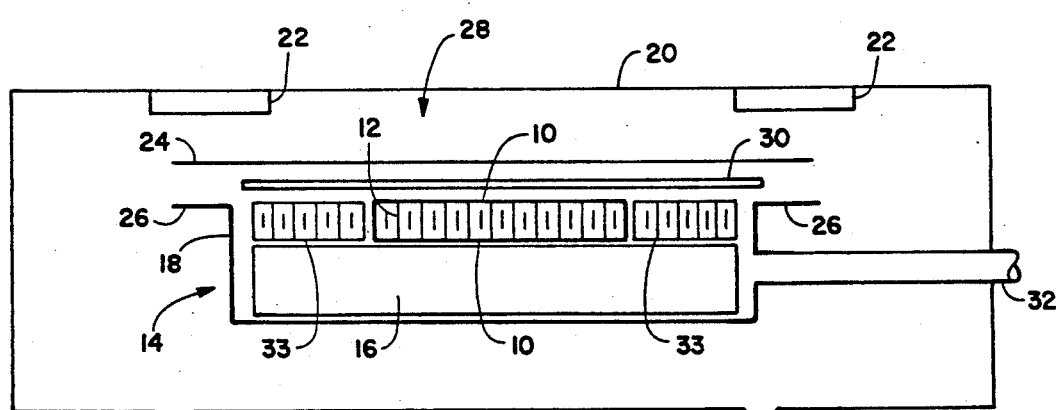

DIFFERENTIAL PRESSURE METHOD AND APPARATUS FOR BONDING HIGH TEMPERATURE STRUCTURES

BACKGROUND OF THE INVENTION

This invention relates in general to bonding of high temperature metal structures and, more specifically to a method and apparatus for bonding structures, such as honeycomb cores to face sheets, using differential pressure applied across a thin metal foil to assure uniform bonding without deformation of the structure.

Multi-component metal structures, such as honeycomb core panels and face sheets, have long been bonded together by coating one component, such as the face sheets, with a brazing material, pressing the components together, then heating the assembly to the brazing temperature. Often, the required pressure is applied by heavy weights or a pile of heavy pellets pressing down on the assembly, such as described, for example, by Rupert et al in U.S. Pat. No. 3,846,903. These methods tend to produce less than optimally uniform bonds and often are limited to flat panels. The pressure producing hardware is difficult to precisely apply, often deforms or damages the structures being bonded and is labor-intensive.

Others have surrounded the structure to be bonded with a thin metal capsule that allows a vacuum to be drawn on the assembly during heating to the bonding temperature, as described by Dewey et al in U.S. Pat. No. 3,173,813 and Henry in U.S. Pat. No. 3,091,846. These techniques, however, require a complex support apparatus with heat exchanger plates abutting the capsule and parts or do not support the capsule sufficiently to prevent distortion during heating. Thin structures, such as honeycomb cores formed from thin metal often are slightly bent or crushed during these bonding processes because of the inflexibility of the capsule walls. These methods seem to be suitable only for the production of flat structures.

Beuyukian et al. in U.S. Pat. No. 3,514,842 describe a method of brazing face sheets to honeycomb core in which the face sheets and core are adhesively bonded together, then enclosed between a pair of sheets that are peripherally bonded together to form an evacuable chamber. This is unlikely to produce a precisely flat or otherwise contoured panel, since there is no solid, dimensionally precise, support for the panel during heating to the brazing temperature.

A method of bonding face sheets to a honeycomb core in which the face sheets themselves form a vacuum chamber to hold them against the core during bonding is disclosed by Hamilton et al in U.S. Pat. No. 4,117,970. With normal, relatively thick, face sheets, deformation of thin walled core is likely if sufficient pressure is provided to superplastically deform the face sheets into tight contact with the core.

The prior art methods and apparatus in general have difficulty in producing curved or tapered panels. The vacuum capsules surrounding the structure being bonded as used in the prior art are thick walled and heavy, so that non-uniform pressure is applied to the structure being bonded. With thin walled structures, such as very light weight, high performance, titanium core panels the core is likely to be distorted by excess pressure in some areas while insufficient pressure in other areas will result in poor bonds. Thus, there is a continuing need for improvements in methods and apparatus for bonding metal structures, such as face sheets to honeycomb cores, that overcome these and other problems of the prior art techniques.

SUMMARY OF THE INVENTION

It is, therefore, an object of this invention to provide a method and apparatus that overcomes the above-noted problems. Another object is to provide a method and apparatus capable of uniformly bonding face sheets to honeycomb cores formed from thin, lightweight, high temperature resistant metals such as titanium and Inconel. A further object is to bond face sheets to honeycomb core in a manner that permits the production of flat, curved and tapered panels. Yet another object is bond face sheets to honeycomb core material that assures uniform bonding without deformation of the core material.

The above-noted objects, and others, are basically accomplished in accordance with this invention by a method and apparatus that initially comprises providing a chamber, typically a vacuum furnace, providing a support member adapted to be placed in the chamber, assembling a structure to be bonded (typically a honeycomb core with bonding material coated face sheets on at least one side of the honeycomb) on the support, placing a sheet of thin high temperature resistant metal foil having a thickness of from about 0.0005 to 0.003 inch over the structure and securing the foil to the support in a gas-tight manner to form a closed, at least partly flexible vacuum bag around the structure. A tube connects the interior of the bag to a vacuum pump. The assembly is placed in the chamber and the chamber and bag are evacuated. The chamber is heated to heat the structure to the bonding temperature, typically the brazing temperature or liquid interface diffusion temperature of the bonding material on the face sheets. Then, the pressure in the chamber is increased, typically by admitting gas at atmospheric pressure into the chamber, to apply differential pressure on the structure through the highly flexible foil. Finally, the chamber is cooled to solidify the bonding material.

A particularly desirable bonding material and method is the liquid interface diffusion bonding system described in detail by Woodward in U.S. Pat. No. 3,768,985, the disclosure of which patent is incorporated herein by reference.

BRIEF DESCRIPTION OF THE DRAWINGS

Details of the invention, and of certain preferred embodiments thereof, will be further understood upon reference to the drawing, wherein:

FIG. 1 is a schematic vertical section showing a first embodiment of apparatus of this invention for making a flat panel;

FIG. 2 is a detail vertical section showing an alternate embodiment of the apparatus;

FIG. 3 is a schematic vertical section showing an alternate embodiment for making a curved panel;

FIG. 5 is a graphic diagram of the temperature and pressure cycle of the method.

DETAILED DESCRIPTION OF PREFERRED EMBODIMENTS

Figure 4:
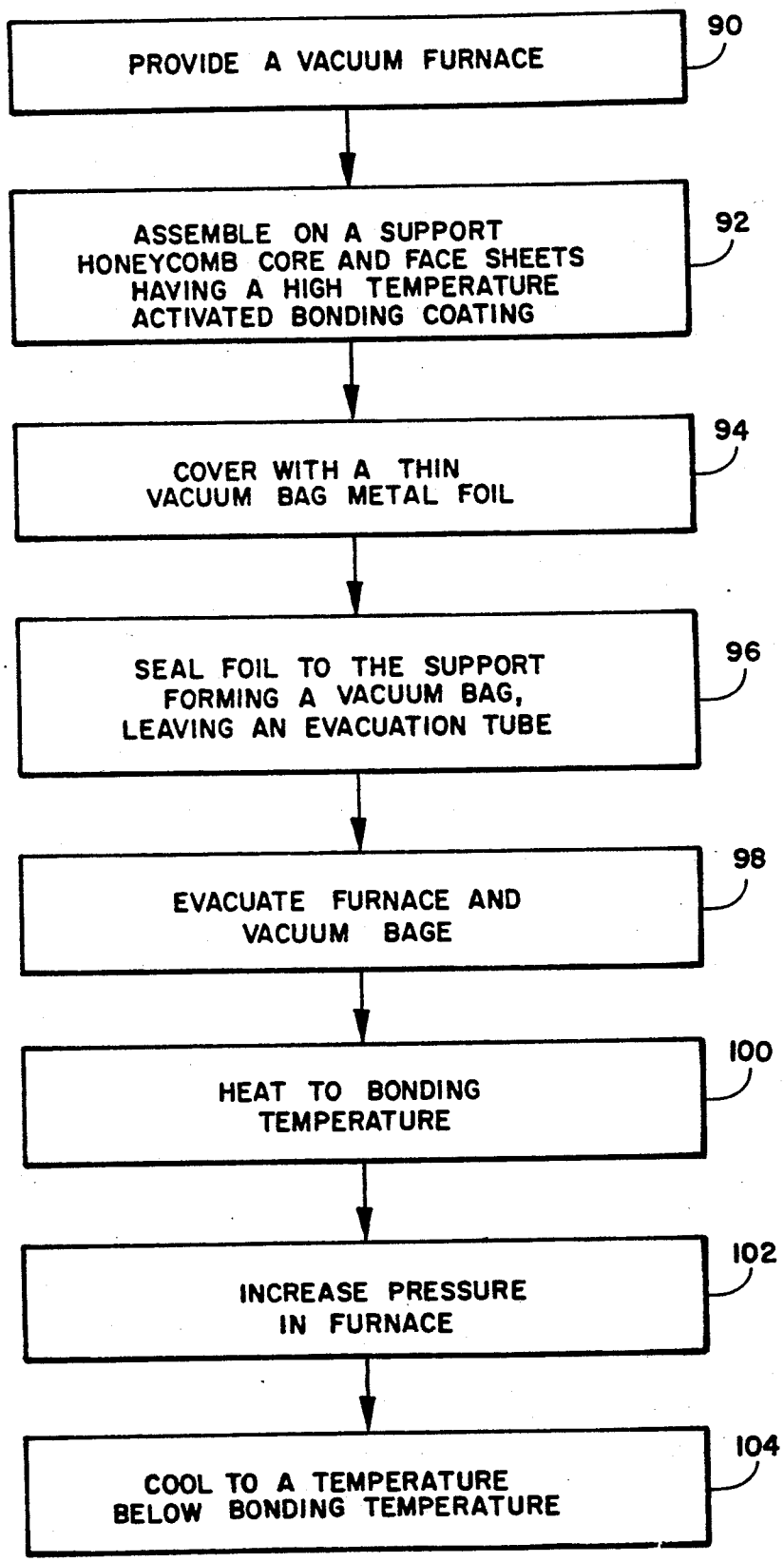
FIG. 4 is a flow chart of the method of this invention.

Referring now to FIG. 1, there is seen a schematic view of a first embodiment of apparatus for bonding face sheets 10 to honeycomb core 12. While any high temperature resistant metal face sheets and honeycomb core may be bonded using this apparatus, it is particularly adapted to the bonding of very thin, lightweight, high performance metals such as titanium and Inconel. Face sheets 10 may be bonded to one or both faces of core 12.

Each face sheet 10 has a heat activated bonding coating (not seen) on the surface in contact with core 12. This coating may be a brazing metal which melts at high temperature and bonds to core 12 as the temperature is thereafter reduced, or may be a coating of the sort detailed by Woodward in U.S. Pat. No. 3,768,985 for use in the liquid interface diffusion bonding technique.

The core and face sheets are supported on a support 14 made up of a graphite block 16 in a metal pan 18 within a furnace 20. Conventional heaters as schematically indicated at 22 are provided to heat the interior of furnace 20 to very high temperatures.

A high temperature resistant, flexible metal foil 24, having a thickness of from about 0.0005 to 0.003 inch, is provided to cover the assembly of core and face sheets and seal against flanges 26 of pan 18. Welding is the preferred method of bonding foil 24 to flanges 26. While any suitable metal which is flexible and retains strength at very high temperatures may be used for foil 24, titanium and stainless steel are preferred because of their optimum properties. Foil 24 with pan 18 forms a vacuum bag 28 with very flexible foil 24 adapted to smoothly and uniformly transfer differential pressure (with pressure in furnace 20 typically at about $10^{-5}$ torr and a vacuum drawn within vacuum bag 28 of slightly greater than $10^{-5}$ torr) to the assembly of core and face sheets.

A high temperature resistant fibrous insulating matt 30 is preferably placed between foil 24 and upper face sheet 10 to separate foil 24 from that face sheet and to reduce the thermal differential across support 14 during heating and reduce wrinkling of foil 24 during heating. Preferably, matt 30 is formed from carbon fibers which retain their physical properties at very high temperatures.

A "picture frame" shaped tool 33 formed from honeycomb core material (corresponding in general in material and thickness to core 12) surrounds the assembly of core 12 and face sheets 10 being bonded. This tool 33 serves to support foil 24 adjacent to the assembly being bonded. This framing tool may be formed from other suitable materials, as desired.

A tube 32 is connected between the interior of vacuum bag 28 and a vacuum pump (not shown) outside furnace 20 to permit the vacuum bag 28 to be evacuated. Similarly, a tube 34 is connected between the interior of the furnace 20 and a vacuum pump (not shown) to evacuate the interior of the furnace 20. An inlet tube 36 is provided to admit gas, typically an inert gas, such as argon, back into furnace 20 at an appropriate time in the cycle, as described in conjunction with the detailed description of the method of bonding using this apparatus, below.

An alternate preferred embodiment of certain components of the bonding assembly is shown in a detail schematic vertical section view in FIG. 2. This Figure shows a vacuum bag assembly 38 corresponding to the right hand end of vacuum bag 28 of FIG. 1. Again, support 40 consists of a pan 42 having a peripheral flange 44 and holding a graphite block 46. An assembly of honeycomb core 48 and at least one face sheet 50 is supported on block 46. That assembly is surrounded by a frame 52 consisting of a carbon material having a thickness corresponding to the combined thickness of core 48 and face sheets 50. A layer 54 of random fiber carbon matt having a thickness from about 0.005 to 0.010 inch is placed above the upper face sheet 50 reduce the temperature differential across the assembly during heating and cooling.

A thin metal foil 56, having a thickness of from about 0.0005 to 0.003 inch, is placed across the support 40, extending about 1.0 to 1.5 inch beyond the edges of flange 44. A strip 58 of the foil material is secured, such as by welding, around the edge of flange 44 and extends outwardly just beyond the edge of foil 56. Foil 56 is secured, such as by welding, to strip 58. This extension of the foil serves to accommodate differential thermal expansion between pan 46 and foil 56 during heating and cooling of the assembly and reduce or eliminate wrinkling of the foil during such heating and cooling.

A carbon felt sheet 60, having a thickness of from about 0.120 to 0.250 inch, is placed across the upper surface of foil 56 to further reduce the thermal differential across the vacuum bag 38 during heating and cooling cycles.

While the honeycomb cores 12 and 48 shown in FIGS. 1 and 2, respectively, are shown to have substantially parallel faces, those faces may be tapered in thickness, if desired. Further, this apparatus may be varied to produce curved or contoured products, as shown in FIG. 3.

Referring now to FIG. 3, support 62 includes a pan 64 holding a carbon block 66 having a contoured upper surface. Edge flanges 68 extend away from the pan. An assembly of preformed face sheets 70 and honeycomb core 72 is placed against the surface of block 66. The edges of this assembly are surrounded by carbon blocks 74 having thicknesses substantially equal to the combined thicknesses of core 72 and face sheets 70. A thin layer 76 of carbon fiber felt is placed over the face sheet and core assembly, then a thin foil 78 is added. As described in the discussion of FIG. 2, strips 80 of foil material are secured to flanges 68 and are in turn secured, such as by welding, to foil 78. A layer of insulating fibrous material 82 is then placed over foil 78. A tube 84 connects pan 64 to a vacuum pump (not shown) for evacuation of the assembly. The entire assembly is placed in a vacuum furnace (of the sort seen in FIG. 1) for the heat and pressure cycles described below.

Since the foil is so very thin and flexible, and capable of high elongation, when the pressure outside the assembly is higher than that within the assembly, the differential pressure forces foil 78 into uniform contact with the assembly of face sheets and core, assuring uniform bonding and a precise shape.

The steps in the method, and certain preferred parameters, are illustrated in the flow chart of FIG. 4.

Initially a commercially available vacuum furnace is provided as indicated in block 90. The furnace should be capable of temperatures in the 2000° F. range and evacuation to a pressure of about $10^{-5}$ torr.

An assembly of face sheets and honeycomb core on a support of the sort shown in FIGS. 1-3 is prepared as indicated in block 92. The face sheets are provided with a suitable coating for brazing or liquid interface diffusion bonding to the core. Typically, the coating may be Titanium-cooper-nickel systems taught in U.S. Pat. No.

3,768,985 or a BNiZ system as specified by the American Society of Testing and Materials (ASTM).

As indicated in block 94, the assembly is covered with a foil sheet having a thickness of from about 0.0005 to 0.003 inch. Optimum results are obtained with foils in the 0.0005 to 0.001 inch thickness range. Any suitable foil material may be used. Excellent results are obtained with titanium or suitable stainless steel, such as 15-7SS stainless steel. The foil sheet may be a single continuous sheet or may be made up by seam welding strips (typically about 3 inches wide) to produce a foil of the desired dimensions and basic contour.

The foil is bonded to the support, preferably by welding, to provide a gas-tight seal, forming a vacuum bag assembly, as indicated in block 96.

The interior of the furnace and of the vacuum bag assembly are connected to vacuum pumps, so that both may be evacuated to a pressure of about $10^{-3}$ to $10^{-6}$ torr, as indicated in block 98.

As indicated in block 100, the furnace temperature is then increased to the bonding temperature of the face sheet coating, typically about 1600° F. to 2000° F. For liquid interface diffusion bonding, the temperature increase cycle is preferably an initial rapid heat-up to about 1200° F. to 1300° F., a hold for about 1 to 6 hours, then a final increase to about 1650° F. to 1750° F., a hold for about 1 to 3 hours, then cooling to room temperature.

At a suitable point during the heating step, the differential pressure in the furnace is increased as indicated in block 102. The pressure may be increased to from about 5.0 to 30.0 torr to force the foil into pressure engagement with the assembly of face sheets and honeycomb core to assure uniform bonding without deformation of the face sheets or core.

Finally, as indicated in block 104 the furnace is cooled to room temperature, the vacuum within the vacuum bag is relieved and the product is removed.

A graphical representation of a preferred pressure/thermal cycle for liquid interface diffusion bonding is provided in FIG. 5. Solid line 110 indicates temperature changes according to the left-hand scale, while broken line 112 indicates changes in the pressure differential between the vacuum furnace and the vacuum bag according to the right-hand scale.

Initially, both the furnace and the vacuum bag assembly are evacuated, typically to about $10^{-5}$ torr, so there is no differential pressure. As indicated by line 114, furnace temperature is increased at a rate of about 20° F./min. until a temperature of about 1300° F. is reached. The temperature is held (line 116) at that point for about 2 hours to allow the vacuum bag assembly temperature to stabilize. Then, the furnace is heated at a rate of about 7° F./min to about 1715° F., as indicated by line 118, and held there for about 135 min (line 120), during which liquid interface diffusion bonding takes place. The furnace is then allowed to cool down at a rate of about 3° F./min for about 3 hours, as indicated by line 122 then power is turned off and the furnace is allowed to cool for about 4 hours to a temperature below about 400° F. (line 124), at which time the vacuum bag assembly can be removed, disassembled and the bonded product removed.

When the second heat-up step is begun, argon gas is admitted into the furnace, increasing the pressure in the furnace to about 2 psig, resulting in a pressure differential between furnace and vacuum bag of about 12 torr, as indicated by broken line 126, pressing the foil tightly against the face sheet and honeycomb core assembly. This pressure differential is maintained until completion of the process, at which time pressure is readmitted to the vacuum bag, as indicated by line 128.

The resulting honeycomb panel has any selected flat, tapered or curved shape, with uniformly bonded face sheets and no deformation of the face sheets or core, which can be formed from very thin, lightweight, high strength metals such as titanium and Inconel.

Other applications, variations and ramifications of this invention will occur to those skilled in the art upon reading this disclosure. Those are intended to be included within the scope of this invention, as defined in the appended claims.

We claim:

1. Apparatus for bonding high temperature resistant metal structures which comprises:
   a chamber;
   a high temperature resistant support means adapted to be placed in said chamber and adapted to support a multi-part high temperature resistant metal structural assembly to be bonded together;
   a high temperature resistant foil sheet having a thickness of from about 0.0005 to 0.003 inch, adapted to cover said assembly on said support means and be bonded to said support to form a vacuum bag;
   means for evacuating gases from within said bag and chamber;
   means for heating said bag to a temperature for a predetermined time at which bonding of a structural assembly within said bag occurs; and
   means for admitting gas into said chamber at a pressure higher than that within said bag.

2. The apparatus according to claim 1 wherein said structural assembly comprises a honeycomb core sheet, at least one face sheet in contact with said core and a layer of high temperature activated bonding material on the surface of said face sheet in contact with said core.

3. The apparatus according to claim 1 wherein said support comprises a carbon block for supporting said structural assembly and a pan for housing said carbon block, said pan having flanges adapted to be bonded to said foil sheet.

4. The apparatus according to claim 3 further including strips of the foil material bonded to said flanges and extending beyond said flanges, said strips adapted to be bonded to said foil sheet.

5. The apparatus according to claim 4 wherein said foil sheet and strips are formed from a high temperature resistant metal selected from the group consisting of titanium, stainless steel, and high carbon steel.

6. The apparatus according to claim 1 further including a layer of high temperature resistant fibrous material in contact with the outer surface of said foil.

7. The apparatus according to claim 6 further including a second layer of high temperature resistant fibrous material between said foil and said structural assembly.

8. Apparatus for bonding high temperature resistant metal face sheets to a high temperature resistant metal honeycomb core which comprises:
   a vacuum furnace;
   a high temperature resistant support means adapted to be placed in said chamber and adapted to support an assembly of a honeycomb core and at least one face sheet, each face sheet having a layer of high temperature activated bonding material on the surface in contact with said core;

a high temperature resistant foil sheet having a thickness of from about 0.0005 to 0.003 inch, adapted to cover said assembly on said support means and be bonded to said support to form a vacuum bag;

vacuum pump means for evacuating gases from within said bag and furnace;

heater means for heating said furnace and bag to a temperature at which bonding of said face plates to said core occurs for a predetermined time; and means for admitting gas into said furnace at a pressure higher than that within said bag.

9. The apparatus according to claim 8 wherein said support comprises a carbon block for supporting said structural assembly and a pan for housing said carbon block, said pan having flanges adapted to be bonded to said foil sheet.

10. The apparatus according to claim 9 further including strips of the foil material bonded to said flanges and extending beyond said flanges, said strips adapted to be bonded to said foil sheet.

11. The apparatus according to claim 10 wherein said foil sheet and strips are formed from a high temperature resistant metal selected from the group consisting of titanium, stainless steel, and high carbon steel.

12. The apparatus according to claim 8 further including a layer of high temperature resistant fibrous material in contact with the outer surface of said foil.

13. The apparatus according to claim 12 further including a second layer of high temperature resistant fibrous material between said foil and said structural assembly.

14. A method of bonding high temperature resistant structures which comprises the steps of:

providing a chamber;

providing a high temperature resistant support adapted to be placed within said chamber;

assembling a high temperature resistant metal structure on said support;

placing a sheet of flexible, high temperature resistent metal foil having a thickness of from about 0.0005 to 0.003 inch over said structure and support;

securing said foil to said support to form a closed bag surrounding the structural assembly;

providing a tube in fluid flow interconnection with the interior of said bag;

evacuating said chamber and said bag;

heating said bag to the bonding temperature of said assembly;

increasing the pressure in said chamber around said bag so that said foil comes into uniform pressure contact with said structural assembly; and cooling said bag to a temperature below the bonding temperature of said assembly;

whereby said assembly is uniformly bonded together without distortion of components of said assembly.

15. The method according to claim 14 wherein said support is provided by assembling a carbon block sized to carry said metal structure in a high temperature resistant metal pan surrounding all but the carrying surface of said block.

16. The method according to claim 15 wherein said foil is secured to said support by welding said foil to the peripheral edges of said pan.

17. The method according to claim 1 wherein strips of said foil are welded to the peripheral edges of said pan and extend beyond said edges and said foil sheet is welded to said strips along lines beyond said edges.

18. The method according to claim 14 wherein said metal structure is assembled by placing at least one face sheet in contact with a honeycomb core, said face sheet being provided with a layer of high temperature activated bonding material on the surface abutting said core.

19. The method according to claim 14 wherein said foil metal is selected from the group consisting of titanium, stainless steel, and high carbon steel.

20. The method according to claim 14 wherein said chamber and bag are evacuated to a pressure of less than about $10^{-5}$ torr, said bag is heated by heating the interior of said chamber to a temperature of about 1200° F. to 1300° F. at a heating rate of about 15 to 25° F./min, gas is admitted to said chamber to provide a pressure differential between said chamber and the interior of said bag of at least about 5 torr, then said chamber is heated to the bonding temperature of a layer of high temperature bonding material provided on at least one component of said metal structure, and the chamber is cooled to a temperature below about 500° F. and gas is admitted into said bag to equalize pressure between said chamber and bag.

21. The method according to claim 14 wherein said metal structure is assembled by placing at least one face sheet in contact with a honeycomb core, said face sheet being provided with a layer of high temperature activated bonding material suitable for liquid interface diffusion bonding on the surface abutting said core and said bag is heated to the liquid interface diffusion bonding temperature for that layer.

22. A method of bonding high temperature resistant structures which comprises the steps of:

providing a vacuum furnace;

providing a high temperature resistant support adapted to be placed within said chamber, said support comprising a carbon block in a high temperature resistant metal pan;

assembling a high temperature resistant metal structure on said support, said structure comprising at least one face sheet having a layer of high temperature activated bonding material in contact with a honeycomb;

placing a sheet of flexible, high temperature resistent metal foil having a thickness of from about 0.0005 to 0.003 inch over said structure and support;

securing said foil to the peripheral edges of said pan to form a closed vacuum bag surrounding the structural assembly;

providing a tube in fluid flow interconnection with the interior of said bag;

evacuating said chamber and said bag to substantially equal pressure;

heating said bag to the bonding temperature of said layer on said at least one face sheet for a predetermined time;

increasing the pressure in said chamber around said bag so that said foil comes into uniform pressure contact with said at least one face sheet and core; and cooling said bag to a temperature below the bonding temperature of said assembly;

whereby said assembly is uniformly bonded together without distortion of components of said assembly.

23. The method according to claim 22 wherein said foil is secured to said pan by welding said foil to the peripheral edges of said pan.

24. The method according to claim 22 wherein strips of the material of said foil are welded to the peripheral edges of said pan and extend beyond said edges and said foil sheet is welded to said strips along lines beyond said edges.

25. The method according to claim 22 wherein said foil metal is selected from the group consisting of titanium, stainless steel, and high carbon steel.

26. The method according to claim 22 wherein said furnace and bag are evacuated to a pressure of less than about $10^{-5}$ torr, said bag is heated by heating the interior of said chamber to a temperature of about 1200° F. to 1300° F. at a heating rate of about 15 to 25° F./min, gas is admitted to said chamber to provide a pressure differential between said chamber and the interior of said bag of at least about 5 torr, then said chamber is heated to the bonding temperature of said bonding material layer, and the chamber is cooled to a temperature below about 500° F. and gas is admitted into said bag to equalize pressure between said chamber and bag.

27. The method according to claim 22 wherein said bonding material layer is suitable for liquid interface diffusion bonding and said vacuum bag is heated to the liquid interface diffusion bonding temperature of said bonding material layer.

* * * * *